(12) United States Patent
Lorünser et al.

(10) Patent No.: US 11,433,600 B2
(45) Date of Patent: Sep. 6, 2022

(54) MATERIAL PROVISION DEVICE FOR A STEREOLITHOGRAPHY APPARATUS

(71) Applicant: Ivoclar Vivadent AG, Schaan (LI)

(72) Inventors: Johannes Lorünser, Bludenz (AT); Walter Pokorny, Bludesch (AT); Rudolf Jussel, Feldkirch-Gisingen (AT); Jörg Ebert, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 114 days.

(21) Appl. No.: 16/463,194

(22) PCT Filed: Nov. 29, 2017

(86) PCT No.: PCT/EP2017/080785
§ 371 (c)(1),
(2) Date: May 22, 2019

(87) PCT Pub. No.: WO2018/099951
PCT Pub. Date: Jun. 7, 2018

(65) Prior Publication Data
US 2021/0170673 A1    Jun. 10, 2021

(30) Foreign Application Priority Data
Nov. 30, 2016   (EP) ..................... 16201429

(51) Int. Cl.
*B29C 64/321*    (2017.01)
*B33Y 30/00*    (2015.01)
(Continued)

(52) U.S. Cl.
CPC .......... *B29C 64/124* (2017.08); *B29C 64/245* (2017.08); *B29C 64/321* (2017.08); *B33Y 10/00* (2014.12); *B33Y 30/00* (2014.12)

(58) Field of Classification Search
CPC ... B29C 64/255; B29C 64/259; B29C 64/321; B29C 64/307; B29C 64/314; B29C 64/343; B29C 64/124
See application file for complete search history.

(56) References Cited

U.S. PATENT DOCUMENTS

| 8,117,983 B2 | 2/2012 | Fork et al. |
| 9,981,425 B2 | 5/2018 | El-Siblani et al. |

(Continued)

FOREIGN PATENT DOCUMENTS

| CN | 103786279 A | 5/2014 |
| JP | H07195529 A | 8/1995 |
| JP | 2009012208 A | 1/2009 |

*Primary Examiner* — Joseph S Del Sole
*Assistant Examiner* — Ariella Machness
(74) *Attorney, Agent, or Firm* — Ann M. Knab; Thad McMurray

(57) ABSTRACT

The invention shows a material provision device for a stereolithography apparatus to provide print material (16), in particular a photopolymer, to be cured, wherein the material provision device (10) surrounds an in particular limp material cartridge (12) which receives the print material (16) on all sides and (UV) light-proof, and the material cartridge (12) comprises an outlet (20) via which the print material (16) may be dispensed and which is received in a connection (43) or a spout in the material provision device (10) and is at least partially supported thereon or therein or seals against it.

19 Claims, 7 Drawing Sheets

(51) Int. Cl.
*B29C 64/124* (2017.01)
*B29C 64/245* (2017.01)
*B33Y 10/00* (2015.01)

(56) References Cited

U.S. PATENT DOCUMENTS

| | | | |
|---|---|---|---|
| 10,723,066 B2 | 7/2020 | Costabeber | |
| 2008/0179786 A1* | 7/2008 | Sperry | B29C 64/112 |
| | | | 264/308 |
| 2012/0195994 A1 | 8/2012 | El-Siblani | |
| 2014/0052288 A1 | 2/2014 | El-Siblani | |
| 2015/0056320 A1* | 2/2015 | Costabeber | B29C 64/124 |
| | | | 425/169 |
| 2016/0151974 A1* | 6/2016 | Costabeber | B29C 64/259 |
| | | | 264/401 |
| 2016/0288421 A1* | 10/2016 | Costabeber | B29C 64/135 |
| 2017/0368751 A1 | 12/2017 | Li | |
| 2018/0370136 A1* | 12/2018 | Stadlmann | B29C 64/259 |
| 2019/0061250 A1* | 2/2019 | Chanclon Fernandez | |
| | | | B29C 64/255 |

* cited by examiner

MATERIAL PROVISION DEVICE FOR A STEREOLITHOGRAPHY APPARATUS

CROSS-REFERENCE TO RELATED APPLICATIONS

This application is a National Stage application of International patent application No. PCT/EP2017/080785 filed on Nov. 29, 2017, which claims priority to European patent application No. 16201429.4 filed on Nov. 30, 2016, all the disclosures of which are incorporated herein by reference in their entirety.

FIELD OF THE INVENTION

The invention relates to a material provision device in accordance with the claims, which is intended particularly for stereolithography apparatuses.

BACKGROUND OF THE INVENTION

Rapid prototyping processes are used increasingly to produce components quickly and with high precision based on CAD/CAM data.

The stereolithography process which is particularly used in the field of dental technology and which may be used further stands out from the known processes. In a way known per se, the respective component is built up in layers from a liquid, the print material, by exposing certain structures.

Here, the layer thickness is between 0.05 and 0.25 mm, which imposes correspondingly high requirements on the drive of the construction platform and on the provision of the print material bath, respectively.

On the other hand, different structures are required to produce different components. With respect to the choice of colors alone, it is favorable to have different print materials ready.

Thus, it has already been suggested to work with movable troughs which each receive a print material in the desired color, respectively, and to move the desired trough with the correspondingly desired color of the print material into the active region, that is to say into the region in which the component is produced.

As the used print materials are typically sensitive to light, the troughs have been provided with a suitable lid or any other cover to prevent early drying out of the print material.

However, this solution is not satisfying as the handling of the troughs frequently leads to or at least may lead to losses of print material and also to contamination of the surroundings, wherein confusion is not excluded either.

A further stereolithography process is known from WO 2010/45951 A1 in which a trough and a cartridge are used among others. The low flexibility of the process is disadvantageous in particular when changing the print material.

SUMMARY OF THE INVENTION

In contrast, the invention is based on the task of providing a material provision device in accordance with the claims, which allows for more universal use of the respective stereolithography apparatus and which is also safe to operate.

This task is inventively solved by the claims. Advantageous developments may be taken from the subclaims.

According to the invention, a material provision device with a material cartridge, which could also be referred to as a cassette and which is closed on all sides, is provided. The closed configuration provides for a light-tight material provision device independent of whether the cartridge is installed or not.

In this respect, the material provision device comprises a mounting frame which is openable and closable in a light-tight fashion. The inventive, in particular limp material cartridge may be inserted into this mounting frame. The material cartridge in turn receives the print material and is configured such that the print material may be dispensed for the rapid prototyping device.

When the rapid prototyping device is realized as a stereolithography apparatus, a trough is provided into which the print material from the material cartridge may be dispensed. For this purpose, the material cartridge comprises an outlet. This outlet corresponds with a connection or a spout which is configured at the material provision device, in particular at the trough, in any case, or which is designed at least such that print material dispensed thereat flows directly into the trough.

The connection may also be configured to be so long that it is immersed into the liquid level of the print material in the trough in any case. In an advantageous configuration, this allows to draw the print material back into the material cartridge if necessary. Basically, the material cartridge is preferably limp. By gravity and/or hydrostatic effects, print material flows out of the material cartridge such that the trough is always filled sufficiently.

However, in an advantageous configuration a press element is provided via which pressure may be exerted on the material. This configuration is preferred in particular if the print material is of medium viscosity such that it does not flow out of the printer cartridge easily.

In this respect, if necessary, a means for impeding reverse motion may also be configured at the press element which prevents the print material from being drawn back into the material cartridge.

It is particularly favorable that a one-to-one assignment between the material cartridge and the trough is realized inventively. This may be ensured for instance by a respective coding such as a mechanical coding. Then, the combination of trough and material cartridge has the same print material provided that the coding is made specific to the material.

Here, specific to the material means both the type of the used print material, that is to say the chemical composition, and also other properties of the print material such as the color of the print material.

In an advantageous configuration, the spatial assignment between material cartridge and trough is realized such that there is a fluid connection between the material cartridge and the trough independent of the state of the trough. Preferably, the trough may be retracted into the material provision device as for the rest and extended therefrom. The mentioned fluid connection is given in all states.

In this way, the desired liquid level of the print material in the trough is ensured independent of the state, that is to say also during construction of the molding to be produced.

To realize a stereolithography apparatus, it is required to provide an exact height of reference during layer construction. According to the invention, a transparent support window serves this purpose which may be configured as a glass plate whose upper side is used as a height of reference. The glass plate serves as a basis for a film which is provided at the bottom of the trough. The film is spanned across the glass plate such that there is always an exact height of reference independent of inaccuracies of guidance when the trough is moved horizontally.

In this configuration, the material provision device preferably comprises a removable bottom. When being stored the bottom wall is closed. When the material provision device is inserted into the stereolithography apparatus, the bottom wall is removed, wherein it is to be understood that the material provision device is received in the stereolithography apparatus preferably in such a way that there is no incidence of light from the sides or from the top.

The material provision device, or to be precise its material cartridge, is lowered further after removal of the bottom wall such that its film rests on the glass plate, namely with a certain pretension, which ensures the height of reference.

Removal of the bottom wall may be realized for instance such that a lamellar construction in the manner of a roller shutter is provided which extends horizontally when the bottom wall is closed and which may be moved to one side and rolled up thereat to be opened. Instead of being rolled up, the bottom wall may also be put in an upright position without further ado, provided that the height of the material provision device is sufficient for this purpose.

In this respect, in practical use the material provision device including the material cartridge and the trough is initially inserted into the stereolithography apparatus. In this state, the roller shutter is closed. In this state, the bottom wall extends just below the trough. The glass plate is not yet in contact with the trough in this state. Then, the bottom wall of the material provision device is removed and the material provision device is lowered such that the glass plate pretensions the film which forms the bottom of the trough.

According to an alternative configuration, it may also be provided for this purpose that the glass plate is lifted to a desired and predefined height which is the height of reference.

At this point in time, that is to say when the glass plate is in contact with the film, the trough is filled but only if this is necessary, that is to say when the trough has not been filled already before. This may be realized, for instance, by effect of a press element.

In any case, an outlet of the material cartridge protrudes into a connection or a spout which is immersed in the trough. Both the outlet and the connection are provided at the construction-side end of the material cartridge. Hence, the trough may be extended from the material provision device without cutting off the connection between outlet and connection. Then, in the extended state, construction takes place, that is to say production of the molding by the stereolithography process.

Preferably, the outlet and/or the connection comprises a valve through which the print material may be dispensed from the material cartridge. The valve serves the purpose of dosing and allows to hold the liquid level in the trough at the desired height in correspondence with the requirements of the stereolithography process.

In a further embodiment, the liquid level may be regulated based on the output signal of a sensor which detects the height of the liquid level.

Then, the valve is received in a valve seat in or at the connection and the above-mentioned coding may then take place between valve and valve seat.

According to the invention, it is favorable if the assignment between material cartridge and trough is maintained when material is changed. The correct coding ensures this. The material provision device may be removed from the stereolithography apparatus and taken to a storage site. When the material cartridge is empty, it may only be replaced by a material cartridge comprising exactly the same material. This is ensured by the coding as a material cartridge with another print material is not insertable then due to the mechanically operated coding for the assignment between the material cartridges and the trough.

The material provision device includes an opening means such as a door or a hatch, or may be opened up or includes a lid which is removable, via which opening means the material cartridge may be removed and one or more further material cartridges may be inserted.

Basically, the trough is also exchangeable, but again only because of its coding, only if its coding fits the coding of the material cartridge. The material provision device is basically reusable and is a reusable part as such. This holds true for all parts of the material provision device except for the material cartridge which is configured as a disposable part. However, the material consumption for the material cartridge itself is very limited especially as it is limp like a bag.

The material provision device with the inserted material cartridge is completely closed and sealed. As long as the trough is not filled, it may be stored in any desired way, also upside down. A mechanical lock ensures that the material cartridge may be removed only if the trough is retracted into its original state, that is to say into the state in which it is received in the material provision device.

In a further preferred configuration it is provided that a valve is disposed at the bottom of the material cartridge, in particular a unidirectional valve, that is to say a valve which only outputs print material. The print material enters the trough through this valve. In an advantageous configuration the valve and/or the associated outlet comprises a coding such that assignment to the currently used print material is always ensured.

Preferably, the outlet protrudes into the trough, in particular in such a way that the liquid level of the trough always remains at a sufficient height, independent of the position of the trough.

In an advantageous configuration, it is provided that a transparent support window, in particular a glass plate, is arranged below the trough and that a film of the trough may be spanned thereacross. The upper side of the glass plate plus the thickness of the film will then give the height of reference during construction or slicing of the stereolithography process.

In a further configuration, the trough comprises a removal latch for the material provision device. As a result of this, the material provision device may only be removed in the state where the trough is below it or inserted into it. However, the removal latch takes effect when the trough is extended.

In a further configuration the press element of the material cartridge is configured specially. In order to prevent accidental sucking in or backflow from the trough, the press element comprises a means for impeding reverse motion. In this way, suction pressure at the outlet is prevented reliably.

In a further configuration of the trough, it is provided that it is equipped with a screen at one corner. It is also possible to provide several screens at every corner of the trough. Excess print material which has remained in the trough may be poured out through the screen and filtered at the same time such that impurities are withheld and the remaining print material may be recycled in this respect.

Then, the print material is preferably dispensed into a trough which comprises the same coding, that is to say which is intended for the same print material. Here, the screen may either be connected fixedly with the trough or handled separately therefrom. The mesh size of the screen may be adapted to the requirements largely; preferably the mesh size amounts to less than 500 μm, preferably to approximately 150 μm.

According to the invention, it is favorable that the material provision device may be opened from the top. Then, the limp material cartridge is exposed and may be exchanged. For this purpose, the material cartridge is pulled out without further ado and the valve of the new material cartridge is plugged into the valve seat. Closing of the material provision device is only possible due to the mechanical lock if valve and valve seat match one another.

The trough may also be exchanged if necessary, wherein a snap connection is provided for this purpose, for instance, which needs to be overcome to exchange the trough.

Instead of the preferred simple valve with the mechanical coding, it is possible to realize several valves and corresponding valve seats, if necessary. When the valve is removed from the valve seat, it is closed automatically or manually. The coding reliably prevents cross-contamination.

Preferably, the valve is configured with multiple deflection in the manner of a labyrinth. This ensures that when the cartridge is removed adhesive material is received in a touch-proof manner, thus does not adhere to the outside freely.

In a further configuration it is provided to realize a divided trough. The trough division may be realized, for instance, with 4×4 individual compartments, that is to say 16 trough parts. Then, corresponding cartridges with corresponding valves hold available the material in the desired manner. This allows for realization of a multi-colored molding with a single material provision device.

It is to be understood that the individual compartments for more frequent colors may be selected to be larger than the compartments with colors used less frequently.

BRIEF DESCRIPTION OF THE DRAWING

Further advantages, details and features may be taken from the following description of an exemplary embodiment of the invention in conjunction with the drawings in which.

DETAILED DESCRIPTION

Figure 1:
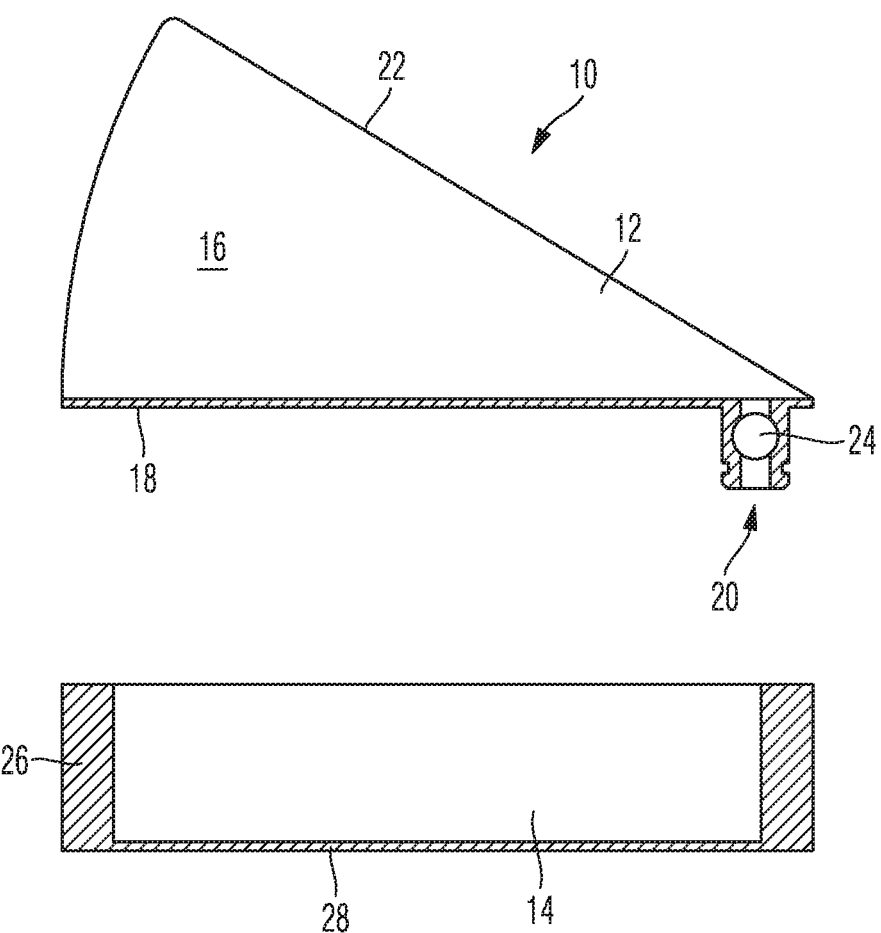
FIG. 1 shows a schematic illustration of a part of an inventive material provision device in one embodiment, namely the material cartridge and the trough, in one embodiment of the invention.

A material provision device 10 is partially apparent from FIG. 1. While the external housing, which may also be referred to as a cassette, is not apparent from FIG. 1, FIG. 1 shows the material cartridge 12 in cross-section on the one hand, and the trough 14 on the other hand. Here, these two parts are illustrated separate from one another for reasons of simpler illustration, while they interact with one another in practice.

Basically, the material cartridge 12 is configured in the manner of a limp bag. It receives print material 16 and comprises a base wall 18 starting from which it extends to the top substantially triangularly in section. An outlet 20 is attached to the pointed side of the triangle at the bottom which is intended to dispense print material 16 from the material cartridge 12 into the trough 14.

During the material output of print material 16, the material cartridge 12 collapses wherein the film which forms the bag of the material cartridge 12 folds up towards the base wall 18.

Except for the liquid print material 16 the material cartridge 12 may comprise residual gas, for instance, nitrogen, but is preferably gas-free such that the interior of the material cartridge 12 is filled completely with print material 16.

Due to gravity, the print material 16 may flow out from the outlet 20 freely. However, it is also possible alternatively to exert pressure on an upper wall 22 of the material cartridge 12 via a press element not illustrated herein such that the material cartridge 12 is compressed under the effect of the press force when the print material 16 is dispensed.

In the exemplary embodiment illustrated herein, the outlet 20 comprises a valve 24. The valve 24 is closed upon separation and removal of the cartridge 12. In an advantageous configuration, it is additionally configured as a one-way valve such that print material 16 may only be dispensed from the material cartridge 12 but not sucked back.

The material cartridge 12 is intended to dispense print material 16 into the trough illustrated further below in FIG. 1. Preferably, the trough 14 comprises a volume which is as large as or slightly larger than the material cartridge 12, wherein it is to be understood that depending on the individual case completely different volumes may be used in this respect, especially if the respective cartridge and trough comprise several individual compartments for different colors of print materials according to an alternative embodiment.

The trough 14 consists of a trough frame which is guided slidably horizontally at the material provision device 10, and of a film 28 which forms the bottom wall of the trough. The film 28 is permeable to light and intended to rest on a glass plate not illustrated in FIG. 1.

The valve 24 of the material cartridge 12 protrudes into the trough 14 by means of a valve seat 42 of the material provision device 10. The extent of protrusion may be selected in any suitable manner, for instance also such that the valve 24 extends up to the film 28 or slightly beyond. In this configuration, back-suction of the print material into the cartridge 12 is possible independent of the filling level of the trough.

Figure 2:
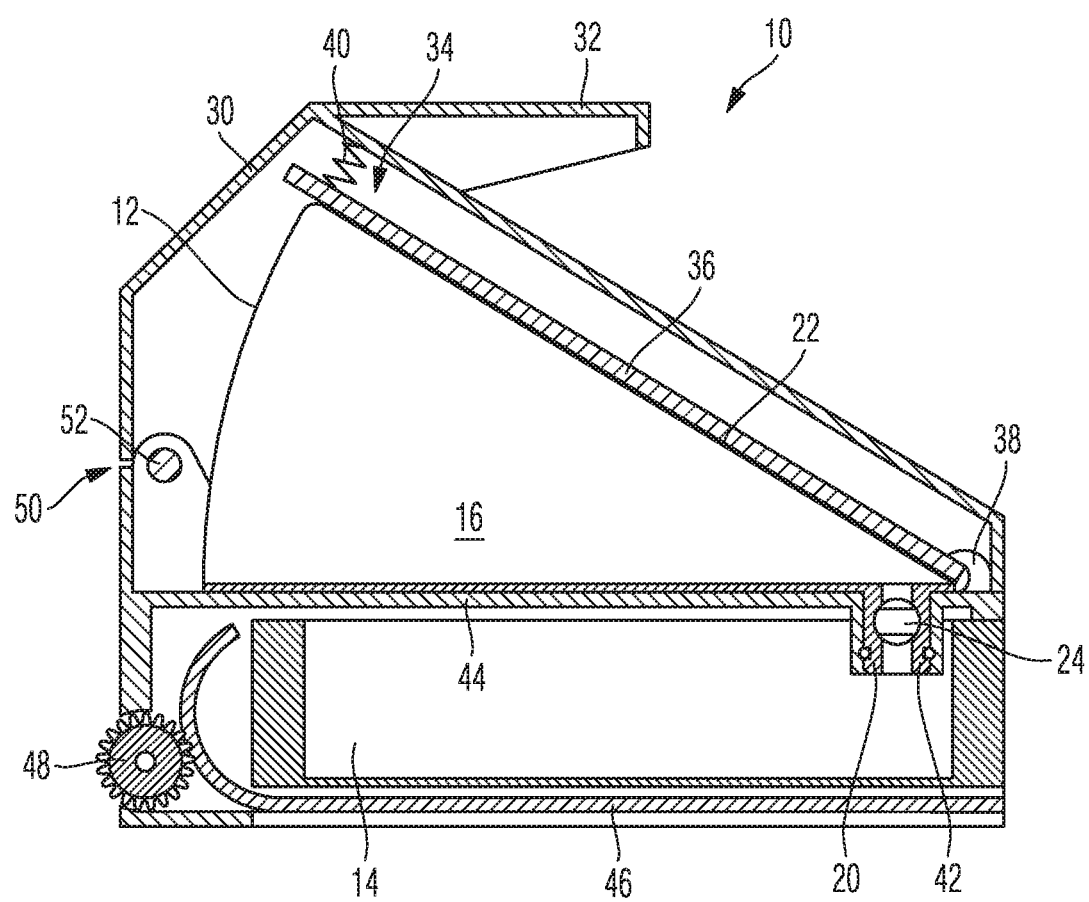
FIG. 2 shows a material provision device in the embodiment according to FIG. 1.

An embodiment of an inventive material provision device in section is apparent from FIG. 2. A cassette 30 which forms the outer frame of the material provision device receives the material cartridge 12 and the trough 14. In section, the cassette 30 has a polygonal shape, similar to a triangle, in correspondence with the original shape of the material cartridge 12.

The cassette 30 comprises a handle 32 which is illustrated in one piece with the rest of the cassette in the exemplary embodiment illustrated.

In a modified configuration, the handle 32 may be folded back to the top and then uncovers the interior of the cassette 30 for changing the cartridge 12.

The cassette 30 of the material provision device 10 comprises a press element 34 which serves to exert pressure on the material cartridge 12 to dispense print material 16.

The press element 34 comprises a press plate 36, a press joint 38 and a pressure spring 40. The press plate 36 is mounted pivotably around the press joint 38. The press plate 36 acts on the upper wall 22 of the material cartridge 12. The pressure spring 40 is illustrated schematically, but has a spring travel in practice which corresponds to the entire height of the material cartridge 12.

As is apparent from FIG. 2, the outlet 20 rests in a connection 43 in a sealed manner which is configured at a partition wall 44 between the material cartridge 12 and the trough 14. In this embodiment, the connection 43 which is configured in the manner of a spout forms a valve seat for the valve 24 at the same time.

The trough 14 extends below the partition wall 44 in a substantially cuboid space of the material provision device 10. The material provision device 10 comprises a removable bottom wall 46. According to the preferred configuration, it is configured as a roller shutter which is movable laterally. The travel possible in this respect arises as a result of the comparison of the upper position and the lower position in FIG. 3. A schematically illustrated drive wheel 48 serves to move the roller shutter or the bottom wall 46.

In the exemplary embodiment illustrated, the trough 14 is positioned at the front, that is to say adjacent to the press joint 38, flush with the cassette 30 of the material provision device 10. It is possible to provide a sealing also in this respect such that the material may not slop out of the trough 14 when the material provision device 10 is removed from the stereolithography apparatus.

At one position, the outlet 20 is immersed into the trough 14 which is adjacent to the front end. The side on which the trough 14 may be pulled out of the material provision device is referred to as "front end".

In the embodiment according to FIG. 2 a parting line 50 is provided approximately at half the height of the cassette 30. It is possible to unlock both parts of the cassette 30 by pulling the holding pin 52 thereat such that the material cartridge 12 may be exchanged.

Figure 3:
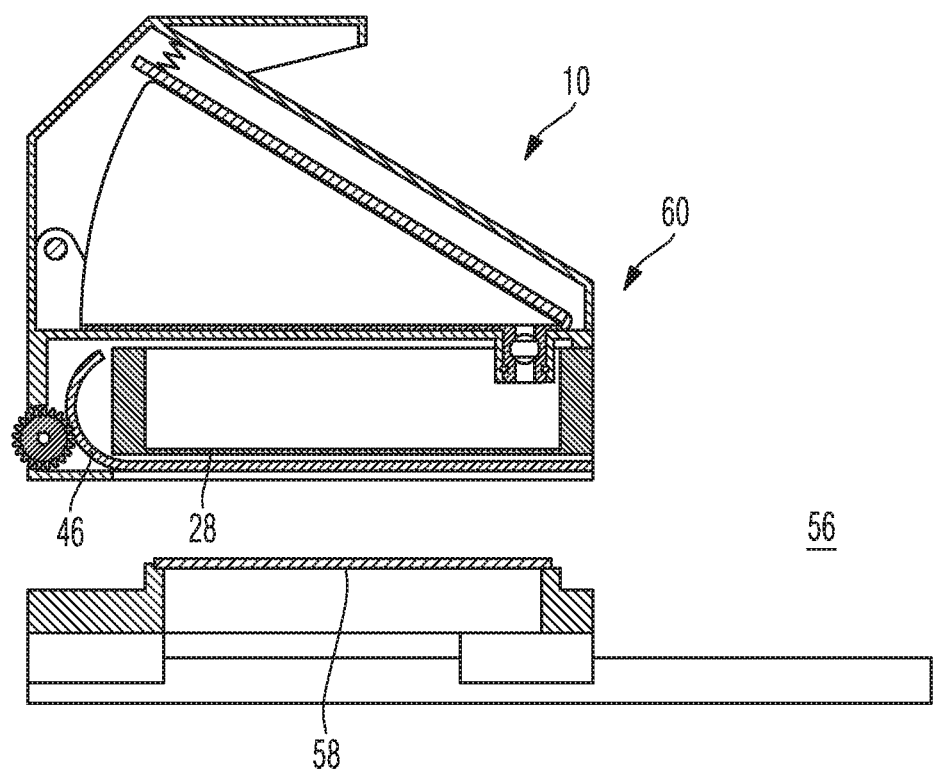
FIG. 3 shows the material provision device in the same embodiment of the invention, however illustrating a part of a stereolithography apparatus as for the rest, in two positions relative to one another.
Figure 3:
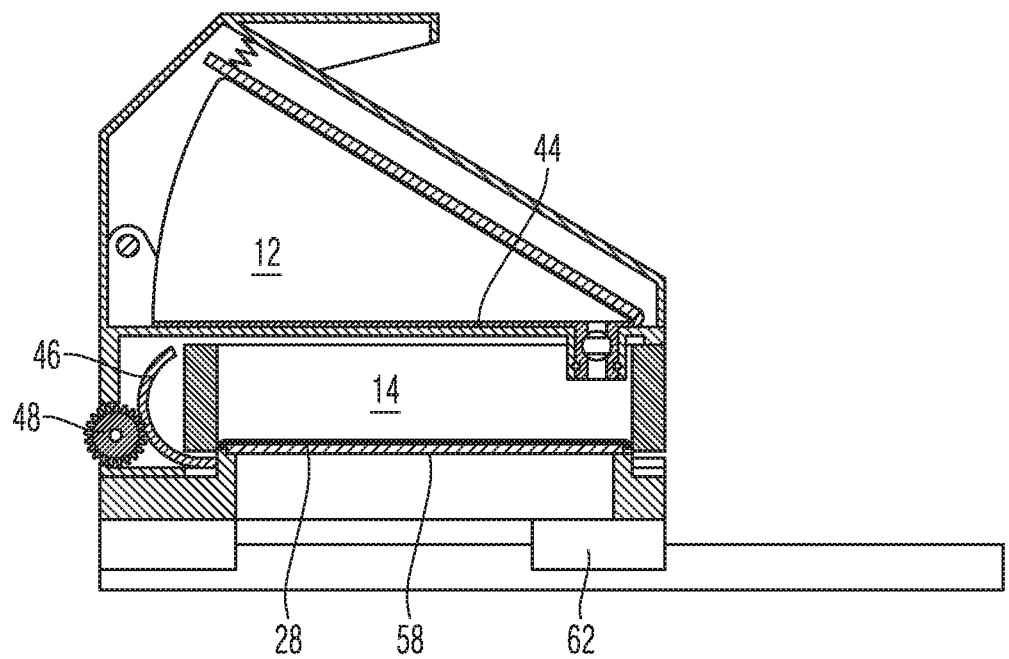

It is apparent from FIG. 3 how the material provision device 10 is positioned above a glass plate 58 when it is inserted into the stereolithography apparatus 56. The glass plate 58 may be moved laterally on a slide guide 62, namely in the direction of the construction platform, that is to say in the direction of the front end 60 of the material provision device 10 and beyond.

Before, contact between the film 28 and the glass plate 58 must be made. The roller shutter 46 extends therebetween in the position according to FIG. 3 at the top.

Before the film is brought close to the glass plate 58, the roller shutter 46 is moved into the release position according to FIG. 3 at the bottom. This is done by actuation of the drive wheel 48. Then, the roller shutter 46 extends parallel to the partition wall 44, just below it.

In a modified configuration, which is not illustrated herein, the roller shutter is rolled up indeed, and in a further modified configuration it is moved to the top, that is to say into the region next to the cartridge 12.

The film 28 is preferably deformed as it rests on the glass plate 58. It is practically spanned across the glass plate 58 such that there is positive locking between the glass plate 58 and the trough 14. In a further embodiment, the film 28 only rests on the glass plate 58 wherein the trough is connected with the slide guide 62 such that the components may be moved together. Here, it is preferred that the film 28 is present in a stretched manner in the trough 14 and that there is only a minimum distance between the film 28 and the glass plate 58.

Several hold-down devices are preferably provided to span the film 28 across the transparent support window which may be configured as a glass plate. These hold-down devices may also be provided outside of the material provision device. The same is conceivable for the fixation or else connection of the trough 14 to the slide guide 62.

Alternatively, it is also possible to ensure positive locking between the transparent support window and the trough 14 by means of an automated mechanical opening mechanism of the dosing device or else of the valve 24.

The glass plate 58 is mounted on a slide guide 62. According to FIG. 4, the unit of trough 14—including the film 28—and glass plate 58 may be moved by means of the slide guide 62 such that this unit is in the region of the construction platform 64. In this state, layer construction and provision of the molding to be produced takes place.

Figure 4:
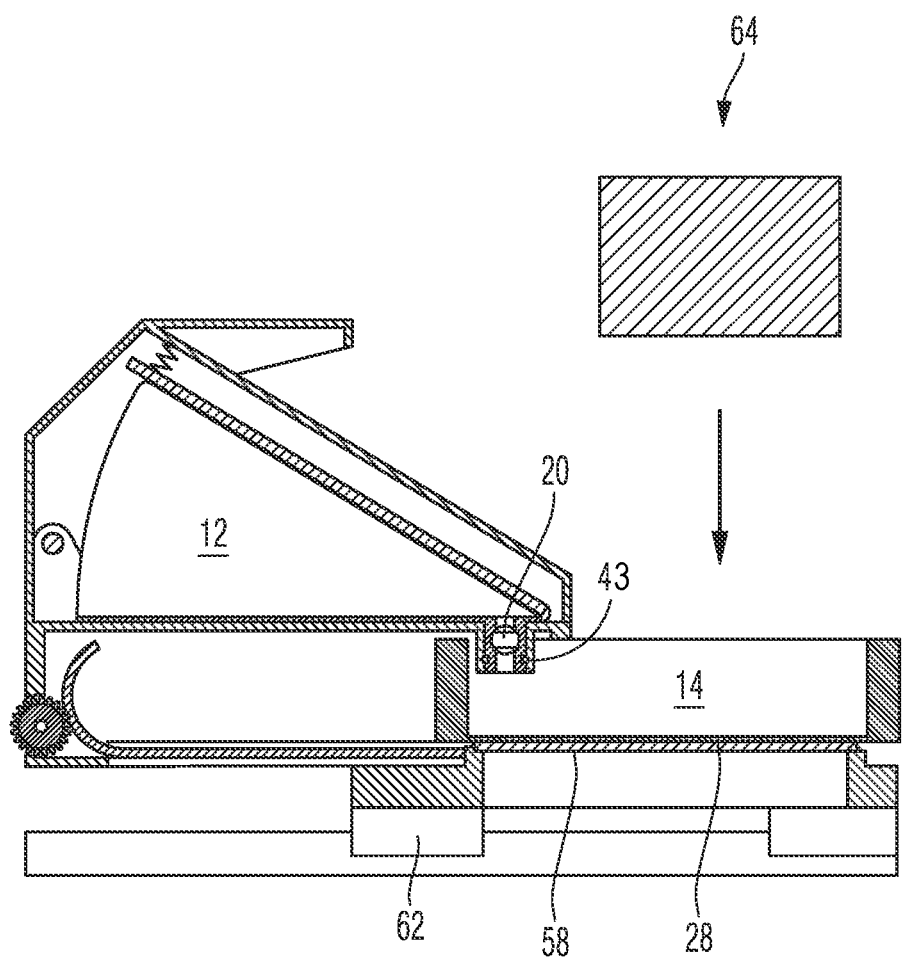
FIG. 4 shows the embodiment according to the FIGS. 1 to 3 in the extended state of the trough.

As is apparent from FIG. 4, the connection 43 and the outlet 20 are still immersed in the trough 14. Thus, further supply of the trough 14 with print material 16 from the material cartridge 12 is ensured.

Bringing the reference plate or else glass plate 58 in contact with the film 28 of the trough 14, as is described according to FIGS. 3 and 4, respectively, may be implemented by other implementations as a matter of course.

For instance, the material provision device 10 may be configured movably, wherein after the film 28 and the reference plate or else glass plate 58 have made contact (in a stretched or non-stretched manner over glass plate/support window), as is described above, the material provision device 10 is moved to the left or to the right, such that the stationary reference plate or else glass plate 58 in connection with the trough 14 is released or exposed.

In a further embodiment, the trough 14 is movable directly towards a stationary support window or else glass plate 58 of a stereolithography apparatus from the material provision device 10 by means of a slide guide, over which glass plate the movable trough 14 or else its film 28 is stretchable or on which it rests.

In case of the material provision devices 10 in which the trough 14 is mounted movably, it makes sense to provide the support window or else the glass plate 58 with a drip protection. The drip protection could be provided, for instance, at the trough 14 or the slide device in a mountable or firmly attached fashion and could be configured as a cover or else plate.

In the retracted state of the trough 14 or else at the starting point of the slide device the drip protection will then cover the support window or else the glass plate 58. When the trough 14 is extended completely or else when the end position of the slide device is reached, the drip protection is not in the region of the support window or else the glass plate 58 anymore.

Here, the cover or else plate is guided by rails which are provided at the stereolithography apparatus.

In the cover or else plate a draining tank is preferably provided which collects material dripping off from the construction platform 64.

Figure 5:
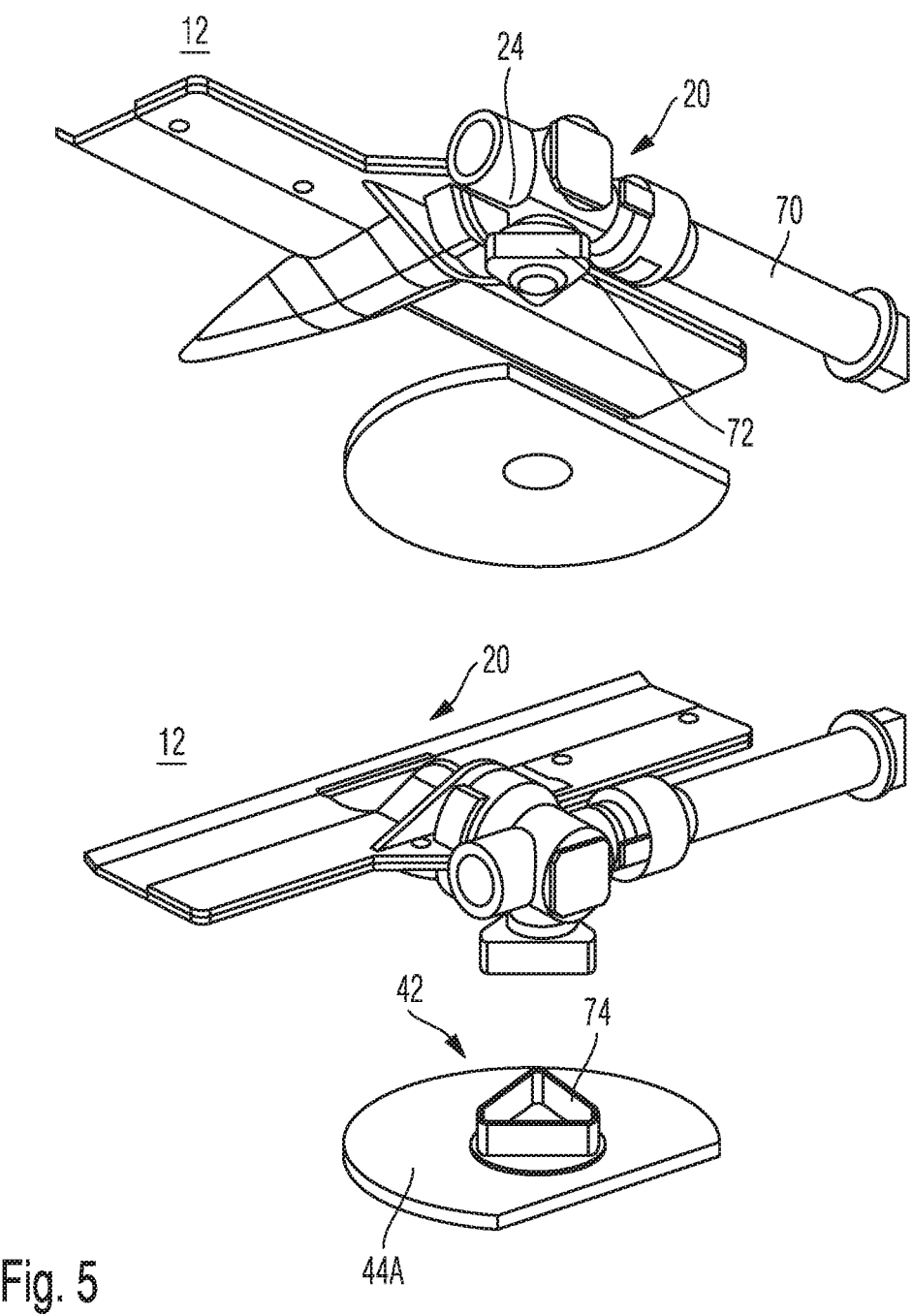
FIG. 5 shows a detailed illustration of valve and valve seat for a further embodiment of the inventive material provision device, with a first coding.
Figure 6:
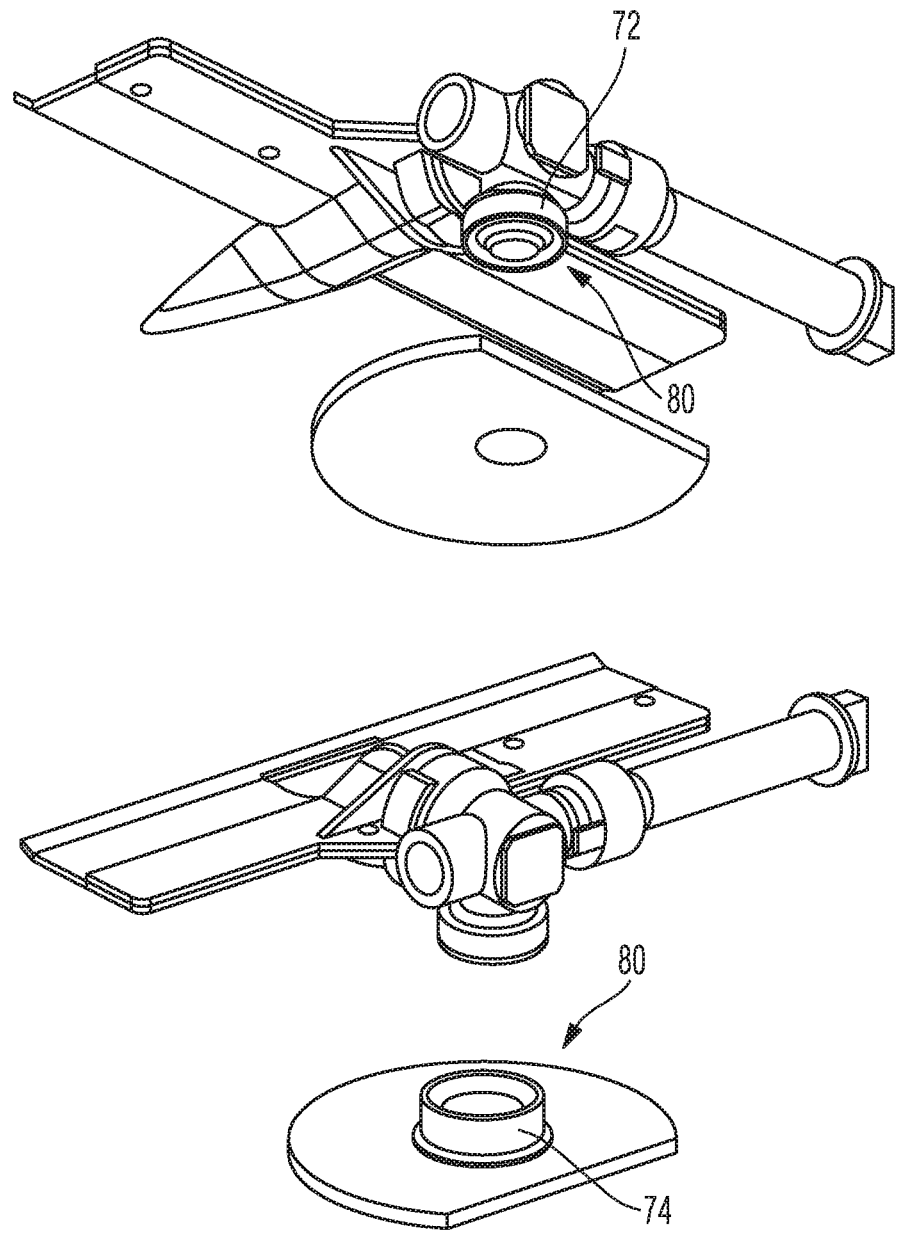
FIG. 6 shows an illustration according to FIG. 5, however with a second coding.
Figure 7:
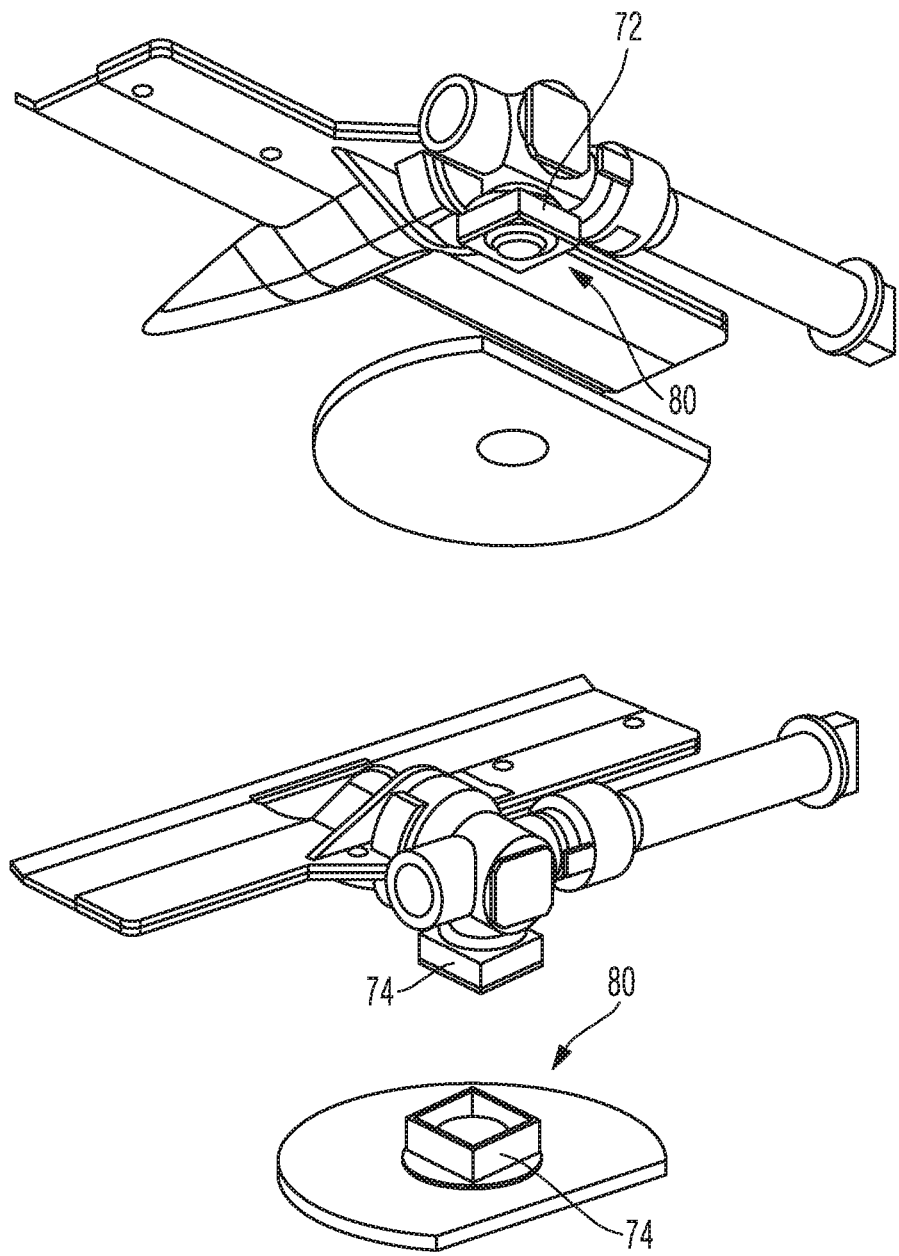
FIG. 7 shows an illustration according to FIGS. 5 and 6, however with a third coding.

A further embodiment of the inventive material provision device is apparent from FIGS. 5, 6 and 7. Here, as in the further figures, the same reference signs refer to the same parts. A valve is attached as a one-way valve with labyrinth in the outlet 20 of the printer cassette 12. It may be opened and closed by means of an actuation lever 70. The valve 24 and the outlet 20 are provided with a specially shaped molding 72 on their bottom sides. Mechanically, this fits exactly a molding 74 which is illustrated in FIG. 5 at the bottom and which enables the connection between the outlet 20 and the connection 43. Here, seals are provided, which are not apparent from FIG. 5, however.

The moldings 72 and 74 have a matching shape. In this respect, both moldings serve the assignment between the material cartridge 12 and the associated trough 14. They form a coding to one another such that it is ensured that always the same print material 16 is output from the cartridge 12 to the trough 14.

In this configuration, a wall 44A is part of the trough but at the same time movable therein such that the desired coding and assignment of the relevant respective parts to one another is possible.

According to FIG. 5, the moldings 72 and 74 have a substantially triangular cross-section.

FIG. 6 shows a coding 80, not matching the coding from FIG. 5, with round moldings 72 and 74.

FIG. 7 shows a corresponding coding 80 with matching moldings 72 and 74 which have a square cross-section.

It is to be understood that the configuration of codings 80 illustrated herein is only exemplary and that any other, preferably mechanical codings are possible without leaving the scope of the invention.

The invention claimed is:

1. A material provision device for a stereolithography apparatus to provide a print material (16) comprising
   a material cartridge (12) which receives the print material (16) and surrounds the print material on all sides,
   wherein the material cartridge (12) comprises an outlet (20) via which the print material (16) may be dispensed and which is provided in a connection (43) or a spout in the material provision device (10) and is at least partially supported thereon or therein or seals against it,
   wherein the device comprises a removable bottom wall (46) configured as a lamellar construction comprising a roller shutter, and
   wherein the lamellar construction is divertible via a lower corner of the material provision device (10) and displaceable towards a rear wall of the material provision device (10).

2. The material provision device as claimed in claim 1, wherein the outlet (20) protrudes into a movable trough (14) which is exchangeable from the material provision device (10) and which is retractable completely into the material provision device (10) and/or mounted therein movably.

3. The material provision device as claimed in claim 2, wherein the trough (14), in the state where it is retracted into the material provision device (10), is closed by a lid and light-tight and material-tight,
   wherein the entire material provision device with the trough (14) and the material cartridge (12) are removable from the stereolithography apparatus as a unit and reinsertable.

4. The material provision device as claimed in claim 1, wherein the material cartridge (12) is configured as a disposable part and the material provision device (10) as a reusable part,
   wherein the material cartridge is light-tight and the material provision device is light-tight.

5. The material provision device as claimed in claim 2, wherein the device comprises a removable bottom wall (46) via which a bottom of the material provision device (10) is closable in a light-tight manner and, openable by exposing the trough (14).

6. The material provision device as claimed in claim 1, wherein the material provision device (10) comprises an opening means via which opening means of the material cartridge (12) is removable and one or more further material cartridges (12) are insertable.

7. The material provision device as claimed in claim 1, wherein one or more troughs (14) are provided which are insertable,
   wherein the or more troughs comprise a coding for matching a coding at the material cartridge (12) and wherein the one or more troughs and the material cartridge having unlatching codings will not fit together.

8. The material provision device as claimed in claim 1, wherein a dosing device is provided at the material cartridge (12), via which the print material (16) may be dispensed into a movable trough both in a retracted and in an extended state and also during movement of the trough (14) into the material provision device.

9. The material provision device as claimed in claim 1, wherein the material cartridge (12) comprises a unidirectional valve (24) for dosing the print material into a trough (14) of the material provision device.

10. The material provision device as claimed in claim 1, wherein the material cartridge (12) comprises a unidirectional valve (24) for refilling the print material (16) and comprises a coding which allows for refilling of currently used print material (16).

11. The material provision device as claimed in claim 1, wherein a valve (24) is configured at the material cartridge (12), sealing against the material cartridge or configured integrally therewith at the outlet (20),
    wherein said valve (24) is supported against a valve seat (42) sealingly,
    wherein said valve seat (42) is connected with a trough (14) of the material provision device (10) which is disposed between the trough (14) and the material cartridge (12).

12. The material provision device as claimed in claim 11, wherein said valve seat (42) comprises a coding which allows for assignment to the material cartridge (12) being currently used.

13. The material provision device as claimed in claim 1, wherein additional material provision devices (10) are provided comprising at least two material provision devices (10) which are opposite one another with respect to a trough (14) in an extended state, and via which the print material (16) may be supplied to the trough (14) optionally by one of the at least two material provision devices (10).

14. The material provision device as claimed in claim 1, wherein a trough (14) comprises a transparent bottom and is extendable from and retractable into the material provision device (10) and/or the material provision device is movable relative to the trough (14).

15. The material provision device as claimed in claim 2, wherein the trough (14) is guided at a slide guide (62) at the material provision device (10) and is removable from the material provision device (10) by a snap-lock connection and exchangeable with another trough (14) of identical construction.

16. The material provision device as claimed in claim 1, wherein the material cartridge (12) comprises a press element (34) or wherein a press element (34) is disposed above the material cartridge (12) in the material provision device (10), by which pressure or suction pressure is exerted on the print material.

17. The material provision device as claimed in claim 1,
wherein the print material (16) comprises a photopolymer to be cured and
wherein the material cartridge is a limp material cartridge.

18. The material provision device as claimed in claim 1, wherein the outlet (20) protrudes into a movable trough (14) which is separate from the material provision device (10) and which is retractable completely into the material provision device (10) and/or mounted therein movably.

19. The material provision device as claimed in claim 6, wherein the opening means comprises a door or a hatch, or
wherein the material provision device is configured for opening upwards or comprises a lid which is removable.

\* \* \* \* \*